(No Model.)

W. P. MILLER.
LUBRICATOR FOR LOOSE PULLEYS.

No. 403,057. Patented May 7, 1889.

Witnesses:
C. E. Sundgren
Joseph W. Roe,

Inventor:
William P. Miller
By attorney
Henry L. Brown

UNITED STATES PATENT OFFICE.

WILLIAM P. MILLER, OF BROOKLYN, NEW YORK, ASSIGNOR TO THE WILLIAM P. MILLER COMPANY, OF SAME PLACE.

LUBRICATOR FOR LOOSE PULLEYS.

SPECIFICATION forming part of Letters Patent No. 403,057, dated May 7, 1889.

Application filed September 20, 1888. Serial No. 285,949. (No model.)

*To all whom it may concern:*

Be it known that I, WILLIAM P. MILLER, of Brooklyn, in the county of Kings and State of New York, have invented a new and useful Improvement in Lubricators for Loose Pulleys, of which the following is a specification, reference being had to the accompanying drawings.

My invention relates to that class of lubricators for loose pulleys in which the hollow or tubular neck of a cylindrical cup for containing the lubricant is screwed into the hub of the pulley, the cup being closed like a bottle at the bottom or end opposite the neck, and containing a piston fitted to slide freely in its cylindrical part, said piston having a hollow rod or stem fitted to slide in the hollow neck and serving to guide the piston and deliver the lubricant to the shaft upon which the pulley revolves, the lubricant being contained in the cup, between the bottom thereof and the piston, and the centrifugal force produced by the revolutions of the pulley causing the piston to press upon the lubricant and force it through the hollow piston-rod to the shaft.

The object of my invention is to reduce the weight of the cylindrical cup, and thereby lessen the tendency to throw the pulley out of balance; and a further object is to simplify and improve the construction of lubricators of this class, thereby reducing the cost and increasing the desirability of such lubricators.

I will now proceed to describe the improvement, and point out its novel features in a claim, reference being had to the drawings, in which—

Figure 1:
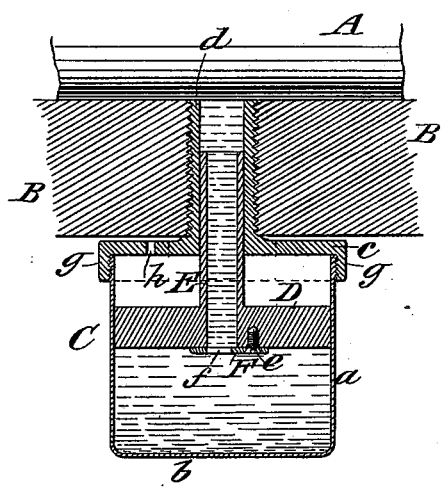
Figure 2:
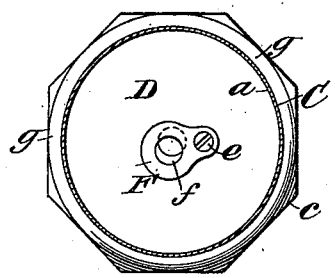

Figure 1 is a longitudinal diametrical sectional view, and Fig. 2 a transverse sectional view, of a lubricator for loose pulleys having my improvement.

Like letters of reference indicate corresponding parts in both the figures.

A designates a portion of the shaft upon which the loose pulley revolves; B, a portion of the hub of the pulley; C, the cylindrical cup consisting of the cylindrical part $a$, bottom $b$, top or cover $c$, and hollow or tubular neck $d$.

D designates the piston, and E the hollow or tubular piston rod or stem. The hollow interior of the stem constitutes an oil-passage continued through the piston, through which the oil or other lubricant contained in the cup below the piston is supplied to the shaft A, being forced through said oil-passage by the pressure of the piston on the body of lubricant, caused by centrifugal force when the pulley revolves.

F designates an adjustable perforated feed-regulating plate pivotally attached to the bottom of piston D by a screw, $e$, passing through a hole in the plate, into which the head of the screw is countersunk and screwing into the piston. When the screw $e$ is loosened, the plate F may be adjusted and may be fastened in any desired position by tightening the screw $e$, or the screw may be tightened enough only to cause friction to prevent the plate from moving from any position in which it is placed, unless considerable force is used to push or draw it one way or another when the piston is taken out for the purpose of adjusting the plate.

$f$ is a circular hole, perforation, or opening through plate F, which may be enlarged or contracted by moving plate F to coincide with the entrance to the oil-passage, and when so adjusted will permit the lubricant freely to enter that passage. The position of plate F may be so adjusted as to wholly or partially cut off the entrance of the lubricant to the oil-passage, thereby regulating the supply through the oil-passage to the shaft. By making the bottom $b$ flat, as represented, and by making the plate F of thin metal and countersinking the screw-hole therein the piston may approach to very near the bottom $b$ and force out nearly all the lubricant.

The bottom $b$ of the cup is flat, and is formed in one piece with the cylindrical part $a$, and may be stamped or pressed out of brass, copper, or other suitable metal, and owing to its form and construction, as herein described, may be made very thin and of light weight, and the part $a$ may be drawn truly cylindrical and smooth internally to receive the piston and accurately fit the same with a "sliding fit." By thus pressing, stamping, and drawing the parts *a* and *b* of the cup C out of brass or copper or other suitable metal the said parts may be cheaply produced and with sufficient accuracy of form without the expensive process of boring or turning, as would be necessary with cast metal, or of fitting a removable bottom to the cylindrical part, as is sometimes done.

The cylindrical part *a* has a screw cut upon the outer part of its open end to screw into the inside of the projecting annular ring *g* of the cover *c*, and may therefore be made of lighter metal than if screwed upon the outside of such a rim.

*h* is a vent-hole to admit air to the interior of the cup above the piston or to permit the escape of air therefrom.

The piston D, being guided by the rod E in the hollow of neck *d*, will move in the cup with very little friction and without binding therein.

The cup is attached to the hub by screwing the neck *d* into a hole in the hub. To refill or clean the cup or remove the piston, the cylindrical part *a* may be removed when the loose pulley has been turned to bring the oil-cup immediately below the shaft, as represented in the drawings, in which position the part *a* and the piston and rod may be removed and replaced without spilling any of the oil or lubricant.

What I claim as new, and desire to secure by Letters Patent, is—

In a lubricator for loose pulleys, the combination, with a cup for containing the lubricant, having cylindrical sides and a substantially flat bottom integral therewith, and a piston fitted to slide in said cup having a hollow or tubular stem or rod through which the lubricant is forced, of a flat adjustable perforated feed-regulating plate pivotally attached to the piston for regulating the supply of lubricant through the piston and rod to the journal, and a securing device for said plate for securing it in any position into which it may be adjusted, substantially as specified.

WM. P. MILLER.

Witnesses:
 FREDK. HAYNES.
 HENRY J. MCBRIDE.